US008631682B2

(12) United States Patent
Telimaa

(10) Patent No.: US 8,631,682 B2
(45) Date of Patent: Jan. 21, 2014

(54) CALIBRATABLE PIPETTE

(75) Inventor: Juha Telimaa, Jarvenpaa (FI)

(73) Assignee: Thermo Fisher Scientific Oy, Vantaa (FI)

( * ) Notice: Subject to any disclaimer, the term of this patent is extended or adjusted under 35 U.S.C. 154(b) by 740 days.

(21) Appl. No.: 11/887,396

(22) PCT Filed: Mar. 31, 2006

(86) PCT No.: PCT/FI2006/000103
§ 371 (c)(1),
(2), (4) Date: Apr. 10, 2009

(87) PCT Pub. No.: WO2006/103315
PCT Pub. Date: Oct. 5, 2006

(65) Prior Publication Data

US 2009/0211332 A1 Aug. 27, 2009

(30) Foreign Application Priority Data

Apr. 1, 2005 (FI) ..................................... 20050340

(51) Int. Cl.
*G01F 19/00* (2006.01)

(52) U.S. Cl.
USPC .......................................................... 73/1.74

(58) Field of Classification Search
None
See application file for complete search history.

(56) References Cited

U.S. PATENT DOCUMENTS

| | | | | |
|---|---|---|---|---|
| 4,128,009 | A | 12/1978 | D'Autry | |
| 4,229,413 | A * | 10/1980 | Marteau d'Autry | 422/100 |
| 4,284,604 | A | 8/1981 | Tervamäki | |
| 4,298,575 | A | 11/1981 | Berglund | |
| 5,481,900 | A | 1/1996 | Husar | |

FOREIGN PATENT DOCUMENTS

| | | |
|---|---|---|
| EP | 0 041 318 | 12/1981 |
| EP | 0 112 887 | 7/1984 |
| JP | 57-174148 | 10/1982 |
| JP | 4-51647 | 4/1992 |
| JP | 5-501222 | 3/1993 |
| JP | 10-503426 | 3/1998 |
| JP | 10-504235 | 4/1998 |
| JP | 2003-516232 | 5/2003 |
| RU | 2 018 324 | 8/1994 |
| WO | 91/05609 | 5/1991 |

OTHER PUBLICATIONS

International Search Report for PCT/FI2006/000103 dated Jul. 12, 2006.
International Search Report for Finnish Priority Appln. No. 20050340 dated Oct. 27, 2005.

* cited by examiner

*Primary Examiner* — Robert R Raevis
(74) *Attorney, Agent, or Firm* — Nixon & Vanderhye P.C.

(57) ABSTRACT

The invention relates to a pipette having a piston and a barrel with variable diameter at least in the portion passing by the sealing point.

8 Claims, 3 Drawing Sheets

CALIBRATABLE PIPETTE

This application is the U.S. national phase of International Application No. PCT/FI2006/000103, filed 31 Mar. 2006, which designated the U.S. and claims priority to Finland Patent Application No. 20050340, filed 1 Apr. 2005, the entire contents of each of which are hereby incorporated by reference.

FIELD OF TECHNOLOGY

The invention relates to a piston-operated pipette for use in dispensing liquids, the pipette comprising a calibration function allowing adjustment of the dispensed volume to the indicated volume. The invention concerns specifically this calibration function.

BACKGROUND OF THE TECHNOLOGY

Piston-operated pipettes usually have a calibration function for setting the piston stroke so that the liquid volume dispensed by this stroke equals the indicated volume as precisely as possible. FI patent specification 64752 (corresponding e.g. to EP specification 112887) discloses such a pipette. This pipette comprises a calibration apparatus allowing adjustment of the lower limit of the stroke. In the practice, calibration is performed by weighing the liquid amount dispensed by the pipette with the indicated volume, and by adjusting the lower stopper until the liquid volume equals the indicated one. Calibration is usually performed during the manufacture, before the pipette is taken into use, and is repeated whenever necessary. Pipettes, such as those mentioned above, usually also have a separate volume control function allowing use of the pipette in a given volume range.

SUMMARY OF THE INVENTION

A pipette as determined in claim 1 has now been invented. The other claims describe some embodiments of the invention.

The pipette of the invention comprises a piston or a barrel with variable diameter. The pipette can thus be calibrated by varying both the stroke length and the stroke starting point.

DRAWINGS

Figure 1:
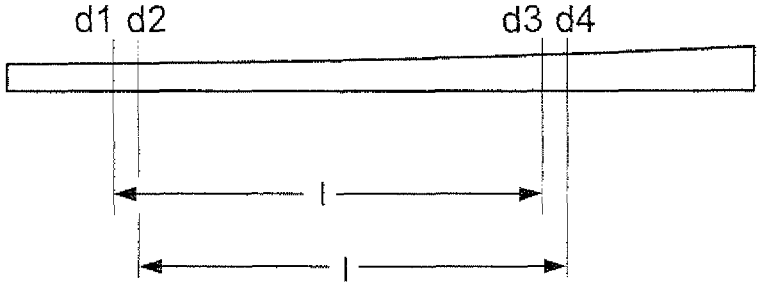
Figure 2:
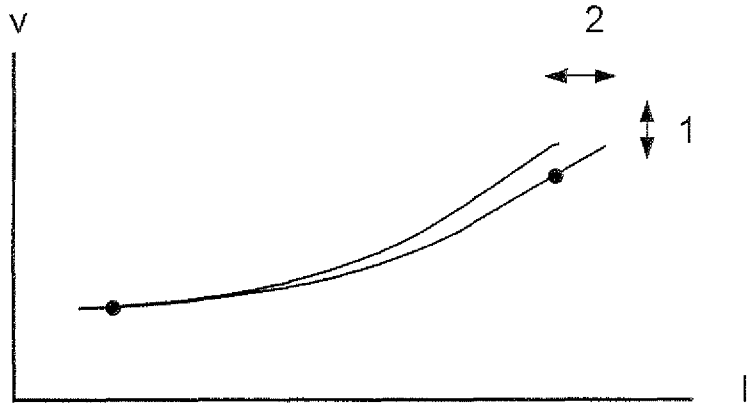
Figure 3:
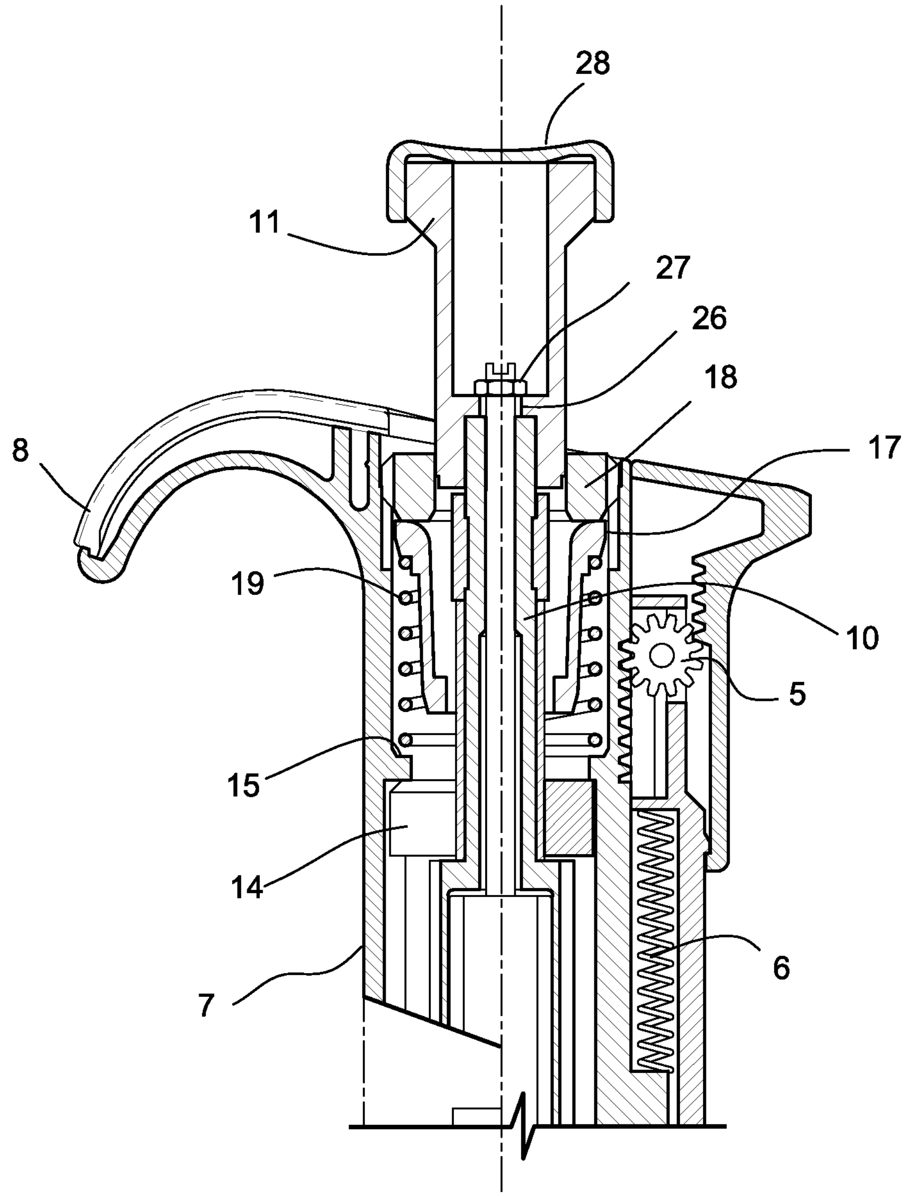
Figure 3:
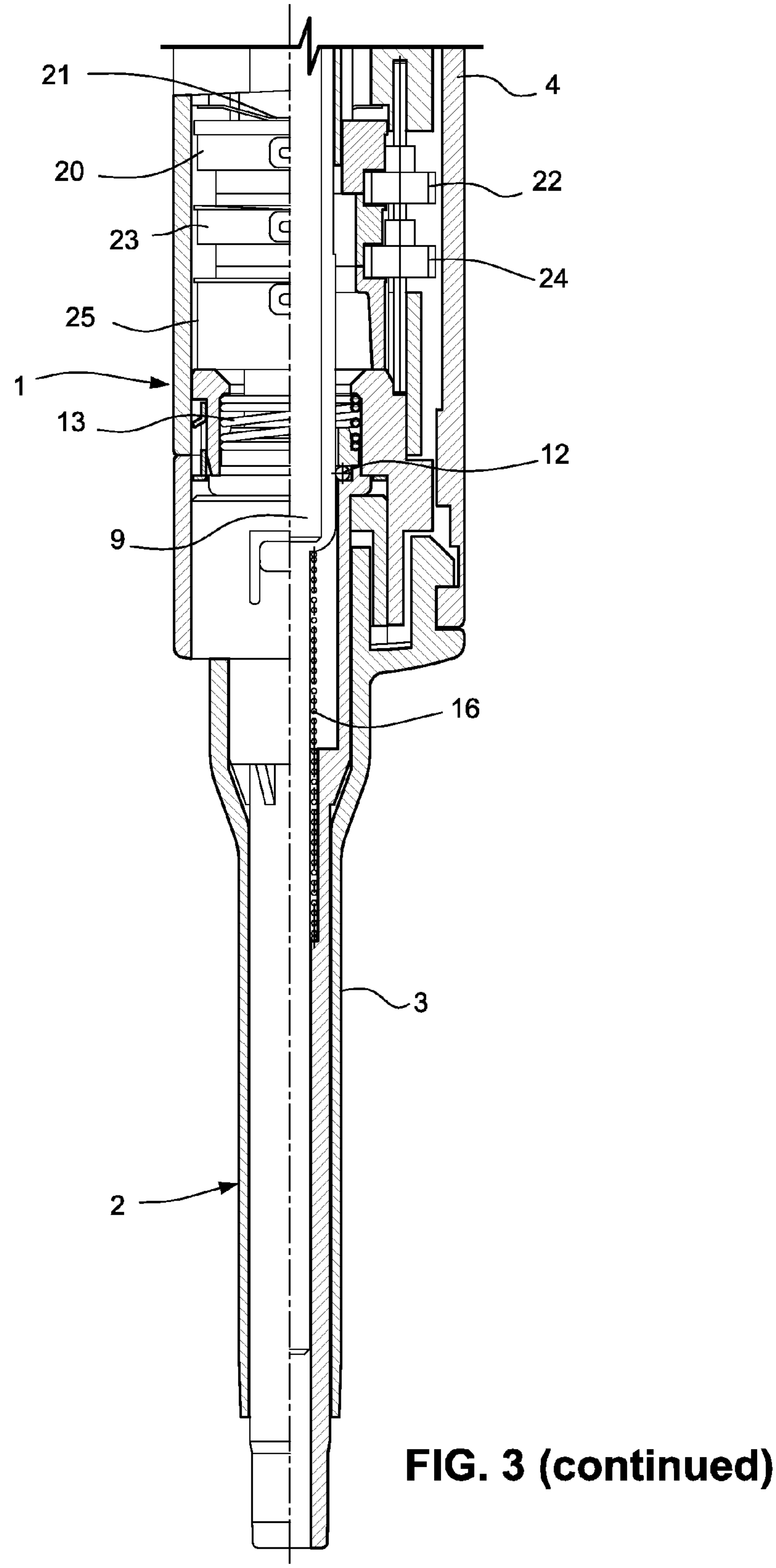

The accompanying drawings pertain to the written description of the invention and relate to the following detailed description of the invention. In the drawings, FIG. 1 shows the conical piston of the pipette FIG. 2 shows the interdependence between volume and stroke length FIG. 3 shows a pipette of the invention.

DETAILED DESCRIPTION OF THE INVENTION

The pipette of the invention comprises a piston and a barrel having variable diameter at least in the portion passing by the sealing point. Preferably, the barrel is cylindrical and the diameter of the piston is variable. The piston may especially be conical, especially such as has a tapering end towards the cylinder. The piston may also have a non-linearly variable shape, resembling a barrel or an hour-glass, for instance. The pipette of the invention can be calibrated both by varying the stroke length and by varying the piston diameter during the stroke. This increases precision, since, if desired, it allows the correction of volume at one single point of the volume range or mutually different corrections at two points, especially at the extremes of the volume range. As calibration can be carried out at two points, flaws in the piston manufacturing techniques will have a smaller impact on precision. Calibration is preferably performed by iteration of the best setting.

When the diameter passing by the sealing point varies, the seal naturally needs to adapt to such a change. The required volume control range is typically about 1%, and then the diameter variation is only of the order of 0.5% over the entire operational range. Adaptation of a seal of this order of magnitude does not cause any problems.

When variable diameter is used, the stroke volume will be in non-linear interdependence with the stroke length.

The volume dispensed by the pipette is most advantageously adjustable. In this case, the volume display should be accordingly non-linear. When a control thread is used, it can be given a non-linear shape matching the conicity, and a special nut with varying thread can be combined with it. The pitch variation of the control thread is of the order of 1% corresponding to the volume change, and then a pitch of 1.6 mm typically requires a change of 0.016 mm. A special nut can be manufactured e.g. by providing it with a thread crest that tapers by a value equaling the pitch variation. The axial play thus produced does not harm the pipette if the pipette comprises a spring (primary spring), against which the piston is pressed. The spring shifts the clearance to the other edge of the thread.

The display can also be provided with a non-linear scale as necessary. The volume display can also be constructed with electrical means using sensors.

FIG. 1 illustrates the stroke volume v of a conical piston in a cylinder. When the piston passes from point d1 to point d3 over the distance l, the stroke volume v1 is $\pi*l*(d1^2+d1d3+d3^2)/12$. When the piston moves over the same distance l starting from the thickest point d2 to the point d4, the stroke volume v2 is accordingly $\pi*l*(d2^2+d2d4+d4^2)/12$. In other words, the volume obtained over a given distance of movement depends on the starting point of the stroke. When a cylindrical piston and cylinder are used (having a constant diameter d), the stroke volume depends on the distance of movement alone.

FIG. 2 illustrates the interdependence between the stroke volume v of a conical piston in a cylinder, which piston can be calibrated at two points, and the distance of movement l. In fact, the volume variation is non-linear, and as the diameter increases over a longer distance, the volume increases exponentially. Calibration can be performed at two points: at one point by changing the starting point of the stroke and at a second point by changing the stroke length. Adjustment of the stroke length causes the curve to be vertically offset (case 1). Adjustment of the starting point, again, alters the slope of the curve (case 2).

FIG. 3 further illustrates an example of a pipette in accordance with the invention.

The pipette comprises a body 1 with a tip portion 2 at its lower end, a tip container, i.e. a tip, being fixed to the lower end of the tip portion. A sliding tip ejector sleeve 3 surrounds the tip portion. It is extended by a tip ejector button 4, which, for reducing the necessary driving force, is urged to move relative to the handle by means of a wheel 5 (cf. FI 92374 corresponding e.g. to publication EP 566939). A return spring 6 for the tip ejector is disposed on the side of the body. A handle portion 7 shaped so as to fit the user's hand is disposed on the body. The body comprises a finger support 8 at its top part.

The tip portion 2 is perforated with a circular hole, which continues as a hole passing through the body 1. In the tip portion there is a piston 9 extended by an arm 10. The lower part of the arm is sleeve-like and disposed around the upper part of the piston. The upper part of the arm is narrower, extending through the body. A knob 11 is provided at the upper end of the arm. At the upper part of the tip portion, the hole has an expansion, and at its bottom an O-ring 12 for sealing the piston against the tip portion. The O-ring is pressed from above by an O-ring spring 13 disposed between the body and the tip portion.

The piston arm 10 comprises a control thread equipped with an adjustment nut 14, whose rotation relative to the body is prevented by means of longitudinal guides and grooves. When the arm is rotated, the nut is consequently moved in the longitudinal direction of the arm. The body comprises a stopper 15, against which the adjustment nut and hence the piston are pressed from below by a primary spring 16. In other words, the adjustment nut and the stopper determine the upper limit of the piston stroke. A sleeve-like secondary support 17 has been slidingly disposed around the upper part of the arm, the secondary support having an internal flange at its lower end. Above the secondary support, a calibration nut 18 is fitted with a thread into the bore in the body, the secondary support being pressed against the calibration nut from below by means of a secondary spring 19, which has greater force than the primary spring. The body of the knob 11 is disposed to move within the secondary support. However, the actuating knob has a larger diameter than the diameter of the hole formed by the lower flange in the secondary support. Together with the flange of the secondary support, the lower end of the knob thus determines the lower limit of the piston stroke. When liquid is aspirated into the tip, the piston is pressed against this lower limit and is then allowed to return towards the upper limit. When liquid is removed from the tip, the piston is pressed further against the force of the secondary spring so as to pass by the lower limit in order to eject the liquid as completely as possible. (Similar arrangements have been explained e.g. in publications FI 64752, corresponding to EP 112887, and in EP 737515).

A first digital ring 20 is fitted with a cotter joint around the piston arm 10 so as to rotate along with this. The upper end surface of the first digital ring comprises a stop notch matching each reading on the ring, the stop notch mating with a boss on the non-rotary ring spring 21 (cf. FI 92374). In this manner, the piston arm will rotate and get locked step-wise. The first digital ring is connected over a first sprocket 22 to a second digital ring 23 located below, so that, after each revolution, the first digital ring rotates the second graduated disc by one step. Similarly, the second graduated disc is connected with a third digital ring 25 over a second sprocket 24.

The portion of the piston 9 passing by the O-ring has a conical shape, with its lower end being narrower than its upper end. For the volume indicated by the digital rings 20, 23, 25 to be correct, the pitch angle of the control thread of the piston arm 10 changes in accordance with the conicity. The adjustment nut 14 is a special nut co-operating with such a changing thread.

The knob 11 is sleeve-like and comprises an internal flange, from which the knob is attached to the end of the piston arm 10 over a thread 26. A locking nut 27 is provided above the flange for irrotational locking of the knob to the arm. The knob cap 28 is removable, giving access to the locking nut when removed. When the locking nut is released, the knob can be turned, and then the piston is moved vertically.

The dispensed volume is usually calibrated by adjusting the correct minimum volume with rotation of the calibration nut 18. (Corresponding calibration arrangements have been explained e.g. in publications FI 64752, corresponding to EP 112887, and EP 737515). A second dispensed volume, usually the maximum volume, can also be calibrated more exactly by adjusting the upper limit by turning the knob 11. Calibration is repeated for the two volumes until optimal precision has been achieved.

The invention claimed is:

1. A calibratable pipette comprising:

a barrel, a piston moveably received within the barrel, the piston being sealed to the barrel at a sealing location, a first mechanism for establishing an upper limit of piston movement within the barrel, and a second mechanism for determining a lower limit of the piston movement within the barrel, wherein each of the first and second mechanisms is adjustable to allow variable adjustment of the upper and lower limits of piston movement respectively established thereby to thus provide a calibration function to the pipette by allowing piston stroke length to be varied so as to achieve a dispensed stroke volume equaling an intended volume as exactly as possible, and wherein the piston has a variable diameter portion which passes by the sealing location during movements of the piston within the barrel between the upper and lower limits thereof to thereby provide a non-linear interdependence of the dispensed stroke volume with the piston stroke length.

2. A pipette according to claim 1, in which the variable diameter portion of the piston is conical.

3. A pipette according to claim 1, wherein the second mechanism allows for adjustment of an end point of an ejecting stroke of the piston.

4. A pipette according to claim 3, in which the first mechanism for establishing the upper limit of the piston movement comprises an adjustment nut movable in a longitudinal direction of the piston.

5. A pipette according to claim 4, wherein the piston includes a piston arm, and wherein the adjustment nut is threadably connected to the piston arm.

6. A pipette according to claim 1, further comprising a piston arm connected to the piston, and a knob connected to the piston arm.

7. A pipette according to claim 6, wherein the knob includes a flange which is threadably connected to an upper end of the piston arm, and a locking nut provided above the flange for irrotational locking of the knob to the piston arm.

8. A pipette according to claim 7, wherein the knob includes a knob cap which provides access to the locking nut when removed.

* * * * *